March 3, 1964     P. C. SHERERTZ     3,123,824
TARGET DESIGNATION SYSTEM Filed Feb. 19, 1952     4 Sheets-Sheet 1

INVENTOR
PAUL C. SHERERTZ

BY
ATTORNEYS

FIG. 2

March 3, 1964 P. C. SHERERTZ 3,123,824
TARGET DESIGNATION SYSTEM
Filed Feb. 19, 1952 4 Sheets-Sheet 3

FIG. 3

INVENTOR
PAUL C. SHERERTZ
BY
ATTORNEYS

United States Patent Office 3,123,824
Patented Mar. 3, 1964

3,123,824
TARGET DESIGNATION SYSTEM
Paul C. Sherertz, % Naval Research Laboratory,
Anacostia Station, Washington 25, D.C.
Filed Feb. 19, 1952, Ser. No. 272,463
15 Claims. (Cl. 343—11)
(Granted under Title 35, U.S. Code (1952), sec. 266)

The present invention relates to a target and director designation system.

The success of a fire control system wherein various targets are to be allocated to respective gun emplacements depends largely on the speed and efficiency with which the various gun emplacements can be directed to respective designated targets. The problems of communicating the identity of a given target from the main fire control officer's station to the operator who controls the position of the guns at a remotely located gun emplacement and in informing such operator of the position of the gun relative to the target, are presented.

In the prior art a search radar is generally used to give a panoramic or maplike view of the targets surrounding a given observation point at all elevation angles. Each gun emplacement is usually equipped with a separate directive radar unit each including a highly directive antenna system to aid the accurate positioning of the guns on a particular target. Accurate azimuth and elevation information of the target provided by the position of the antenna of a directive radar circuit and target range information also supplied by the radar are fed to a computer which in turn controls the position of the guns at the gun emplacement. The latter gun control radar units are called director radar units. The beam angle of the director radar is generally narrow in both the horizontal and vertical planes.

The number of targets on the face of the cathode ray tube display of the search and director radar units may be large. In such a case it is quite difficult to quickly designate particular targets to the operators of particular remotely-located director radar stations from the several targets on the cathode ray tube screen. It is also difficult to give an operator of a gun emplacement a quick and fairly accurate estimate of the azimuth position of a designated target relative to the direction of the director radar.

The present invention substantially eliminates these difficulties by providing on the face of a single cathode ray tube, herein called the designation indicator, on which a maplike presentation of the targets in the surrounding area are shown, coded markers surrounding the targets to be designated, and coded indications automatically showing the position of the director radar antenna relative to the targets. The latter indications will be hereinafter called "director azimuth markers." Such a cathode ray tube presentation is placed at each director radar position and also at the main fire control officer's position at the search radar station. The fire control officer positions the various target code markers on various targets presented on the cathode ray tube display before him, which display is duplicated on the other cathode ray tube indicators at the director radar position, and then by any suitable communication means informs the various director radar operators of the code character representing the respective targets to be tracked. The director radar operator then positions the director antenna on the designated target thereby bringing the coded director azimuth marker on the face of the cathode ray tube display before him in coincidence with the designated target.

The target information is preferably shown in a different color than the coded indentification marks to differentiate the targets from the marks.

The present invention is especially adapted to utilize the characteristics of certain commonly known varieties of cathode ray tubes which produce a yellowish phosphorescence when a high intensity electron beam is used, and a blue fluorescence for a low intensity electron beam. Color differentiation may thus be simply obtained.

The system comprising the present invention results in a substantial decrease in the complexity and amount of verbal information to be communicated between the fire control officer and the director radar operator resulting in increase of speed and efficiency of target acquisition. It also enables the fire control officer to handle a larger number of director radar units and making possible the tracking of a larger number of targets in a given time.

The director radar positions may also be provided with respective azimuth and elevation indicators which respectively give a presentation of the narrow horizontal and vertical angles scanned by the director radar to enable the director radars to be more accurately positioned on the target. Also at each director station a fourth cathode ray tube display may be provided with an expanded range sweep (hereinafter called a precision sweep) of a portion of either the azimuth or elevation presentation so that more accurate target information may be obtained. The portion indicated by the precision sweep is shown on the first three mentioned indicators by marks extending over the range indicated by the expanded precision sweep.

Accordingly, one object of the present invention is to provide a novel arrangement and combination of search and director radar apparatus enabling a more quick and efficient allocation of various targets to respective radar controlled gun emplacements.

Another object of the present invention is to provide a novel arrangement and combination of search and director radar apparatus which will enable the director operators to position the director radar on a newly designated target more quickly and efficiently.

Another object of the present invention is to provide a novel target designation system which will decrease the complexity and amount of verbal information required to be communicated to the director radar operators.

Still another object of the present invention is to provide a novel two color visual presentation including information on target location, the position of one or more director radar antennas, and of the extent of the director radar precision sweeps.

Another object of the present invention is to provide on the face of a single cathode ray tube information which will enable a quick and efficient determination of the location of a designated target, the position of the several director radar antennas, and of the respective director radar precision sweeps.

These and other objects will become apparent from the specification and drawings wherein:

FIGURE 5 shows the voltage waveforms at the output of the deflection voltage mixer circuits shown in FIGURE 3.

For a detailed description of the present invention, reference is now made to the drawings where like reference characters refer to the same or similar elements.

Figure 1:
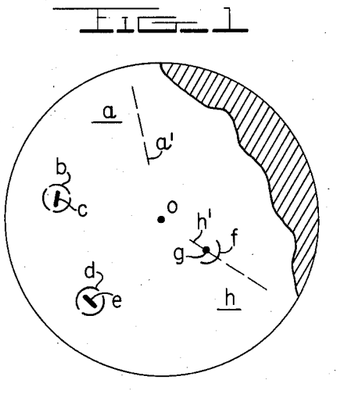
FIGURE 1 is a face view of the designation indicator.
Figure 2:
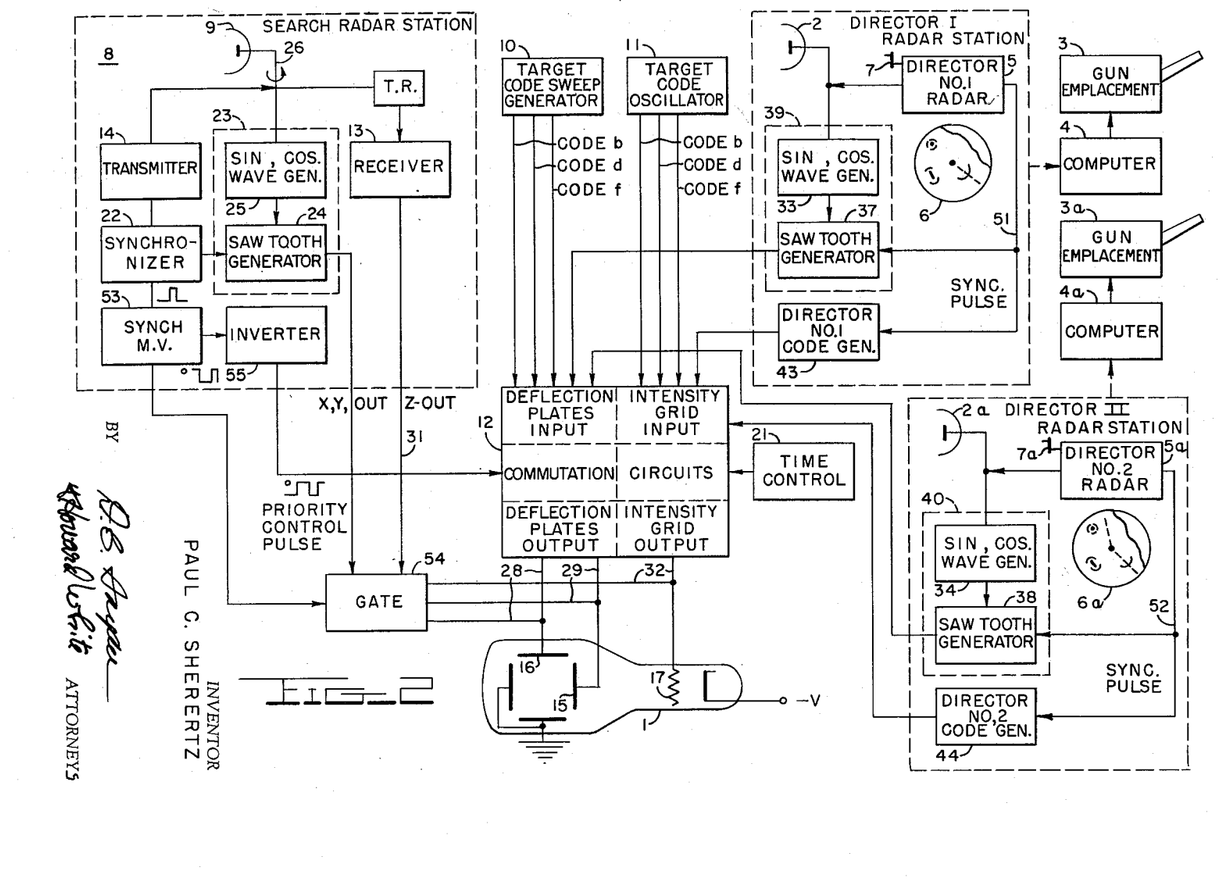
FIGURE 2 is a simplified block diagram of the system forming the present invention.

The heart of the present indicating system is the designation indicator 1 shown in FIGURE 1, which presents coded radial line indications $\underline{a}$ and $\underline{h}$ of the azimuth of typically two respective director antennas 2 and 2a shown in FIGURE 2, and coded indications typically $b$, $d$ and $f$ comprising arc segments of a circle designating the targets $c$, $e$ and $g$ which may represent ships or airplanes and the like. The position and length of the first line segments $a'$ and $h'$ respectively of the director azimuth markers $\underline{a}$ and $\underline{h}$ shows the range segment indicated by a precision sweep included in the director radar. The number of dashes in the director marks $\underline{a}$ and $\underline{h}$ identifies the particular director radar antenna, while the number of separated arc segments about a target identifies the particular target.

Referring now to FIGURE 2, a simplified block diagram of the system of the present invention is shown, from which the manner of utilizing target indicator 1 to increase the speed and efficiency of positioning various gun emplacements on specific targets may be seen.

By way of illustration two gun emplacements 3 and 3a, are to be positioned on separate targets, and are to be controlled in a conventional manner by the output of respective computer devices 4 and 4a which obtain direction and range information from respective director radar units 5 and 5a.

The director radar antennas 2 and 2a are preferably of the type that scan with a very narrow beam such that the cathode ray tube indicators associated therewith, more fully described hereinafter, give target information in only a very restricted area.

In the prior art systems, the director radar antennas were placed on target by approximate range and direction information communicated verbally by the fire control officer who obtained this information from the face of a conventional search radar plan position (P.P.I.) cathode ray tube display. The search radar presented a maplike view on the face of a cathode ray tube of all targets surrounding the search radar antennas within the operating range of the search radar apparatus. The designation indicator 1 includes such a display, obtaining search radar information from search radar station 8 and associated antenna 9.

Where there are several targets within the same approximate range and direction, or where the target is a fast moving one so that target direction and range is continually changing, the difficulties involved in positioning the director radar on a verbally designated target in a short time become apparent.

In the present invention, target indicators 6, 6a and 1, of the type shown in FIGURE 1 are respectively placed at director radar stations 5, 5a and at the fire control officer's position at search radar station 8. The fire control officer by manual means to be later described positions coded target markers $b$, $d$ and $f$ on respective targets $c$, $e$ and $g$ shown on the target designation indicators 1, 6 and 6a. Then only the assignment of a particular target code character need be communicated to the director radar station to inform the operator which target to track.

Since the azimuth of each director radar antenna is shown by a respective coded line on the same cathode ray tube face as the targets, it takes only a few seconds to place a particular director radar antenna at the azimuth of a designated target. Once the azimuth and range of a target is obtained the most time consuming part of the target tracking operation is completed, and the target may be found simply by searching in elevation.

Director radar units used for tracking airborne targets must of course be able to obtain information on elevation angle of a target. The U.S. patent to Lancor 2,533,267, patented December 12, 1950, discloses radar apparatus which obtains azimuth and elevation information and is capable of providing cathode ray indications of azimuth-range and elevation-range information. The director radar used with the present invention may be of the type disclosed in the above patent wherein the radar unit is made to scan a narrow beam angle, thus obtaining information only from the area in which the desired target is located. The director azimuth markers $\underline{a}$ or $\underline{h}$ may be made to extend over the same azimuth angle as the azimutth angle scanned or in the alternative may be made to provide an indication of the medium scanned azimuth angle.

Accordingly, director radar stations I and II may be provided with azimuth-range indicators and elevation-range indicators respectively showing the targets in the horizontal and vertical angles scanned by director radar antennas 2 and 2a.

As is well known in the prior art, the indicators used with the director radars generally have a long range sweep for giving an approximate range and direction indication of the targets and an expanded range sweep, or vernier, for giving more accurate range information. An example of this type of apparatus is shown in the Norgaard Patent 2,455,265, patented November 30, 1948. The expanded sweep is called the precision sweep. The range segment indicated by the precision sweep may be made adjustable, as by means of a hand wheel control, so that any designated target can be brought within the precision sweep.

As shown in FIGURE 1, the director radar antenna marker $\underline{h}$ designated by two dashes is seen intersecting a target $g$. Assuming azimuth code indication $\underline{h}$ corresponds to the azimuth of antenna 2 of director radar station I, the extent of the first mark $h'$ of the azimuth marker $\underline{h}$ indicates the range segment shown on the precision sweep of a suitable cathode ray tube indicator associated with director radar 5. Since mark $h'$ passes through target $g$, target $g$ will be seen on the precision sweep indicator. By means of a hand control such as 7 at director radar 5 the extent of the precision sweep can be made to include a given designated target if it is not already so included. Accurate information of range is then obtained from the precision sweep.

It should be understood that the circuitry and operation of a precision sweep and its adjustment by means of a hand control are well known in the art and a detailed disclosure of such prior art apparatus has therefore been omitted from this specification.

A precision sweep indicator is preferably provided at each director station and represents an expanded portion of the sweep of the azimuth-range indicator.

As herein illustrated in FIGURE 2, designation indicator 1 is a conventional cathode ray tube including a single electron gun unit including electrostatic horizontal deflecting plates 15, vertical deflecting plates 16, and a control grid 17.

As previously stated, the designation indicators 6 and 6a located at the director stations merely duplicate the presentation of designation indicator 1 located at the fire control station so that a description of the operation of indicator 1 will apply equally to indicators 6 and 6a. If the elements of cathode ray tubes 1, 6 and 6a are in parallel circuit relation it is clear that the presentation on indicator 1 will appear on indicators 6 and 6a.

The information required for providing the novel cathode ray tube indication shown in FIGURE 1 is obtained, as shown in FIGURE 2, from director radar stations I and II and search radar stations 8 operating in conjunction with target code sweep generator 10, target code oscillator 11, and a plurality of additional components generally indicated as commutation circuits 12.

Figure 4:
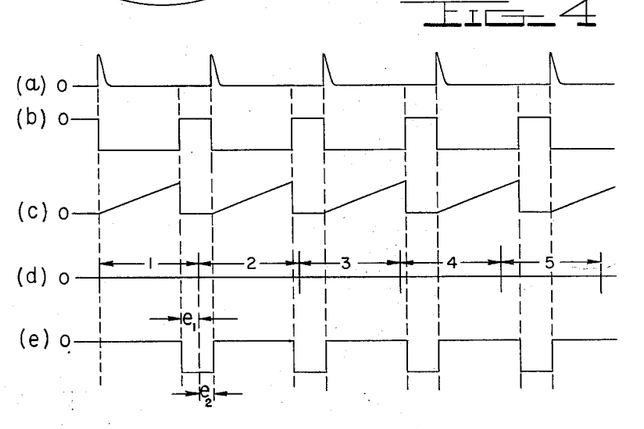
FIGURE 4 is a diagram comparing the various time intervals within one information cycle with various waveforms found in the circuit of FIGURE 2.

As it is desirous to utilize all the search radar information available, it is contemplated that the present system be operated in a manner which gives priority to such information. The remaining information, i.e. the coded director azimuth markers and the coded target selector marks, is to be applied sequentially to indicator 1 by means of the commutation circuits 12 only during times when search radar information becomes unavailable for presentation, for example, during the "dead" period between search radar sweeps. This may be more clearly seen by reference to FIGURE 4. As shown in FIGURE 4d the information cycle as determined by the commutation circuits 12 is divided into at least as many time intervals as there are coded information units, the present system requiring five segments 1–5. Three of the five time segments are assigned to the target code markers; the remaining two segments being used to provide the two azimuth code marks.

During each time interval a different coded information unit is available for presentation. However, as search radar information is to be given priority, the coded units are blocked from indicator 1 for the periods coincident with the negative gate pulses shown in FIGURE 4b and the search radar sweep voltages shown in FIGURE 4c. Thus, the coded information units are applied to indicator 1 in segments, which segments may be determined by comparing time intervals 1–5 of FIGURE 4d with the negative gate pulses shown in FIGURE 4e. Each of the waveforms of FIGURE 4 will be referred to and described more fully hereinafter.

Although the coded information units are applied to indicator 1 in segments, no significant disadvantage is incurred. The rapid repetition rate of the search radar, the use of long persistent phosphors for the cathode ray tubes 1, 6 and 6a and a non-synchronous timing for intervals 1–5 and the search radar pulse rate insure the complete presentation of the coded information. As alluded to, time intervals 1–5 are controlled by a free-running time control unit for the commutation circuit 12 which causes the repetition rate of the information cycle to be different from the search radar repetition rate. This random control permits the search radar and each of the director radars to be operated non-synchronously.

Figure 3:
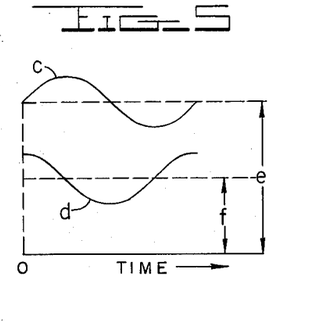
FIGURE 3 is a more detailed block diagram of certain of the components of the system shown in FIGURE 2.
Figure 7:
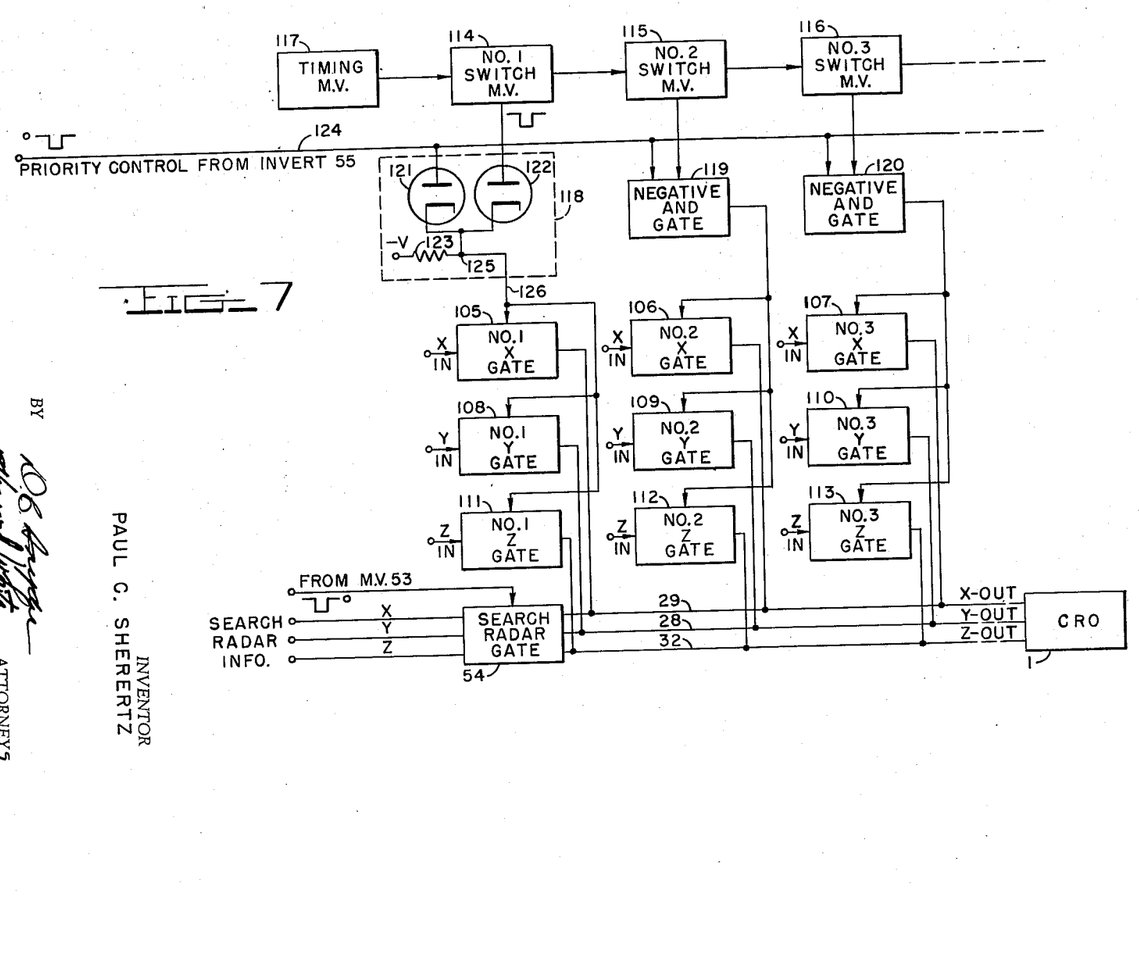
FIGURE 7 is the sequential electronic switch circuit used to automatically switch the various types of coded information fed to the designation indicator.

Referring briefly to FIGURE 3 which shows more fully a mechanical simplification of the commutation circuits 12 of FIGURE 2, multiple position switches 18, 19 and 20 perform the function of switching the various horizontal deflection voltages, the vertical deflection voltages and the intensity signal or code voltage respectively to horizontal deflection plate 15, vertical deflection plate 16, and intensity control electrode 17 of the designation indicator 1. For simplicity these switches are shown merely as mechanical switches whose rotor positions are controlled by a control means 21. Switches 18, 19 and 20, however, are subject to being periodically decoupled from indicator 1 by respective priority control switches 18a, 19a and 20a which, when in the position shown in FIGURE 3, permit the search radar sweep voltages and radar receiver video to be fed to indicator 1. Switches 18a, 19a and 20a are likewise shown as simple mechanical switches, the two positions of which are controlled by control means 21a. The electronic equivalent of these switches and time control means is shown in FIGURE 7, the operation of which will be later described.

Referring again to FIGURE 2, search radar antenna 9, receiver 13, transmitter 14, synchronizer 22, sweep generator generally designated as 23 and indicator 1 cooperate in a well known manner to provide plan position information of the targets surrounding the search radar antenna. The details of most of these circuits have therefore been omitted from this disclosure. Priority is given this information by circuit means including typically a conventional one-shot multivibrator 53, gate 54, and also conventional inverter 55. In operation, multivibrator 53 is tripped by the synchronizing pulse from synchronizer 22. A negative pulse is derived from multivibrator 53 which opens gate 54 for the duration of the search radar sweep. Sweep voltages from generator 23, and search radar video from receiver 13 may then be fed through gate 54 to indicator 1 for an interval corresponding to the negative pulse from multivibrator 53. For the purpose of providing an adjustable range for the search radar, the parameters of multivibrator 53 may be varied to produce variable output pulses in a well-known manner.

The output pulse from multivibrator 53 is also fed to inverter 55, which produces a negative pulse coincident with the "dead" period of the search radar sweeps. This pulse is fed to commutation circuits 12 for the purpose of unblocking these circuits in a manner to be described in connection with FIGURE 7.

Referring again to FIGURE 4, the synchronizing pulse from the search radar synchronizer 22 is shown in 4a. This pulse, being fed to multivibrator 53 and sweep generator 23, initiates respectively the negative pulse of FIGURE 4b and the sweep voltage of FIGURE 4c. The output from inverter 55 is shown in FIGURE 4e from which it can be seen that the negative pulse is coincident with the interval between the search radar sweeps.

Again with reference to FIGURE 2, the sweep of the indicator 1 begins from the center O of the face thereof and progresses radially outward. The sweep lines are to be rotated by applying conventional sine and cosine modulated sawtooth waves from sweep generator 23 to the horizontal and vertical deflection plates 15 and 16 respectively. The angular position of a sweep line represents the instantaneous azimuth of the search radar antenna 9. For more detailed analysis and disclosure a sweep system of this nature is disclosed in U.S. Patent 2,438,947 to Rieke et al. granted April 6, 1948.

The sweep generator circuit 23, as exemplified in the Rieke Patent 2,438,947, comprises a pair of conventional sawtooth generating circuits shown in FIGURE 2 of the present invention as 24, each having a resistance in series with a condenser and a control voltage source. The control voltage source applies separate direct current voltage proportional in magnitude and polarity to the sine and cosine of the angle at which it is desired the beam of the indicator is to be swept. Each of the described condensers charges in a given time to a voltage which is proportional in magnitude and polarity to the applied control voltage and is periodically discharged by means of an electronic switch. In the patent to Rieke last referred to, the switch is electronically pulse synchronized so that each condenser discharges quickly upon the corresponding switch receiving a synchronizing pulse. The sawtooth voltage developed across each condenser is applied to a pair of the deflection plates of the cathode ray tube indicator.

Figure 6:
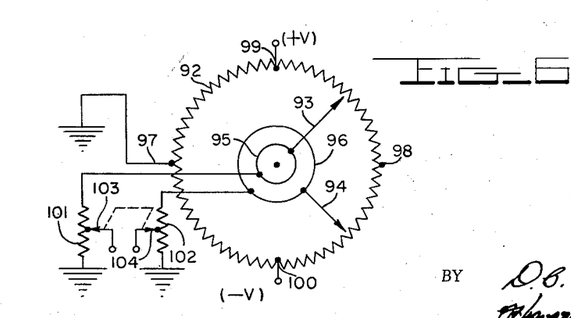
FIGURE 6 discloses a resolver used to provide two direct current voltages proportional respectively to the sine and cosine of the angle of rotation of the director and search radar antennas, and the target selector control wheels.

The control voltage for the sawtooth generating circuits 24 is obtained from a potentiometer unit 25 located at the base of the rotatable vertical shaft 26 of the search radar antenna 9, and produces voltages proportional in polarity and magnitude to the sine and cosine of the azimuth angle of the search radar antenna. (The circuit details of potentiometer unit 25 are shown in FIGURE 6 and will later be described.) The sine and cosine control voltages thus control the sawtooth output of voltage generating circuit 24 the output of which is coupled to deflection plates 15 and 16 of the indicator 1 by means of a path including gate 54 (contacts 1 of switches 18a and 19a, FIGURE 3) and conductors 28, 29.

The synchronizing pulses, used to synchronize the sweep in the manner shown in FIGURE 6 of the previously cited patent to Rieke et al., are fed to the sweep generators from the search radar synchronizer 22 by means of a path including conductor 30, in FIGURE 3. These pulses occur at the pulse repetition rate of the search radar.

The echo pulses obtained in the output of the search radar receiver are fed to the intensity control grid 17 of indicator 1 from search radar receiver 13 through a path including conductor 31, gate 54 (contact 1 of switch 20a) and conductor 32.

The director azimuth markers $a$ and $h$ representing the azimuth of the director radar beams are produced by modulating the beam of indicator 1 at the angle representing the respective director antenna beam azimuth. Accordingly, potentiometer units 33 and 34, FIGURE 2 (similar to potentiometer unit 25), are respectively coupled to the vertical shafts of the director radar antennas and produce a pair of direct current voltages, the magnitude and polarity of which are proportional to the sine and cosine of the azimuth of the director antenna beams.

These direct current voltages from the potentiometer units 33 and 34 located at the base of the director antennas are fed to and control the output of respective sawtooth generating circuits 37 and 38. Potentiometer units 33 and 34, and sawtooth generators 37 and 38 comprise sweep generators 39 and 40 which are similar to generator 23 just described and are coupled to the deflection plates 15, 16 through contacts 1 and 5 of switches 18, 19 and contacts 2 of switches 18a and 19a respectively, as shown in FIGURE 3. Since all of the movable contacts of switches 18, 19 and 20 are simultaneously on the same switch position, it is clear that the information from each of the director radars is separately fed to the indicator 1.

The intensity modulation voltages for the director azimuth marker code are provided by code generators 43 and 44. The generator voltages are respectively coupled to the control grid of the indicator 1 through switch contacts 1 and 5 of switch 20 and contact 2 of switch 20a. As is commonly done in the art, the beam of indicator 1 is rendered invisible except when a signal voltage is applied to the intensity control grid 17.

The director azimuth markers are identified by the number of dashes along the azimuth marker line. As previously discussed, the position and length of the first marker along each director azimuth mark indicates the extent of the precision sweep of the particular radar director. The frequency of the beam intensity modulation therefore must be made such that the length of the code dashes equals the extent of the precision sweep of the particular director radar. The director code generators as shown in FIGURE 3 thus include conventional oscillators 45 and 46 each providing a square wave output such that the length of the code markers may be determined by the time intervals during which a portion of the square wave output causes the beam of indicator 1 to increase in intensity.

The number of dashes in the azimuth marker code are respectively controlled by the time interval during which gate circuits 47 and 48, coupled respectively to the output of director code oscillators 45 and 46, are opened. Respective gate circuits 47 and 48 may be conventional amplifier tubes which are either in a state of conduction (gate is open) or non-conduction (gate is closed) depending on the control voltage fed from a conventional one-shot multivibrator or flip-flop switches 49 and 50. When a gate circuit is open, the signal fed to the input thereof appears in the output. When it is closed no output signal is present.

Gates 47, 48 are opened in synchronism with the start of the precision sweep. In the conventional manner, the extent of the precision sweep of a director radar indicator is controlled by a gate pulse, the width of which is coextensive with the duration of the precision sweep (see input to switch tube T-1, FIGURE 1 on pages 3–10 of the 1944 edition of the book "Principles of Radar" by the Massachusetts Institute of Technology staff). Similar to search radar station 8, each of director radar stations I and II include a synchronizer from which gating pulses may be derived coincident with the radar sweep, but also additional gates coincident with the precision sweep. After suitable differentiation, the precision sweep gate may be used to trigger the one-shot multivibrator circuits 49, 50 to thereby open gates 47, 48 for a time interval sufficient to produce the desired number of pulses for the azimuth marker code. This time interval is regulated by the time constant of the circuits making up the one-shot multivibrators 49, 50.

If it is desired, director radar video may be mixed with the output of code oscillators 45 and 46 to be fed therewith to intensity grid 17 in order to accentuate the brightness of the target designations which fall along the director azimuth marker.

Pulses from the synchronizer in each of the director stations I and II also serve to synchronize sweep generators 39—40, respectively coupled to the synchronizers by conductors 51 and 52, at the pulse repetition rate of the director radar.

The target code markers $b$, $d$ and $f$ are positioned on the face of the indicator 1 by means of hand controls 60—65 shown in FIGURE 3. Controls 60—62 position the $x$ (East-West) position of the code markers while controls 63—65 regulate the $y$ position (North-South) of the code markers.

The controls 60—65 adjust the settings of units 66, 67 and 68 which may each comprise a pair of conventional potentiometers, with means for varying the outputs thereof in polarity and amplitude.

The pairs of voltages at the output of potentiometer units 66—68 are to be fed respectively to the horizontal and vertical deflection plates 15 and 16 through conventional mixer circuits 69—70, 71—72, and 73—74 where sinusoidal voltages obtained respectively from an oscillator 75 and a phase shifter 76 are superimposed on the direct current control voltage fed from the potentiometer units 66—68. The manner in which the composite voltage is utilized will be later explained.

The cathode ray tube beam is to be swept in a small circle about the $x$ and $y$ coordinates determined by the position of hand controls 60—65. By modulating the beam of indicator 1 at a frequency which is a multiple of the frequency at which the beam is swept in a circle about the designated target, the visual trace on the face of indicator 1 will consist of circular patterns of one or more arc segments depending upon the modulating frequency. The target designation circles $b$, $d$ and $f$ are coded by varying the number of dashes or arc segments making up the circular code indications shown in FIGURE 1.

FIGURE 5 discloses the deflecting voltage waveform at the output of mixers 69, 70. The mean value $e$ of sinusoidal voltage waveform $c$ representing the output of vertical deflection mixer 70 is proportional to one of the direct current control voltages from target selector potentiometer unit 66.

The mean value $f$ of the sinusoidal waveform $d$ representing the output of horizontal deflection mixer 69 is proportional to the other direct current control voltage from target selector potentiometer unit 66.

It is well known in the art that a cathode ray beam will be swept in a circle if two sinusoidal voltages having the same amplitude and frequency, but displaced in phase by 90 degrees, are fed respectively to the vertical and horizontal deflection plates of a cathode ray tube. Thus waveforms $c$ and $d$ which are fed respectively to the horizontal and vertical deflection means of indicator 1 during the time interval 4 of the information cycle shown in FIGURE 4d, and are 90 degrees out of phase. The coordinates of the center of the coded circle b is dependent on the polarity and relative amplitudes of the direct current components e and f of the mixer output voltages c and d. The relative amplitudes of the direct current voltages are proportional respectively to the x and y coordinates at which it is desired to place the center of the coded circle as was previously explained.

Although the target designation marks thus far disclosed form a circle about the target, for some purposes an elliptical shape may be desirable. This may be accomplished by varying the phase shift produced by phase shifter 76 to differ from 90 degrees.

The output voltage waveforms from mixer circuit pairs 71—72 and 73—74 are produced in a similar manner to the output of mixer circuit 69—70 just described.

Thus the pair of voltages associated with target selector potentiometer unit 66 are fed to the horizontal and vertical deflection plates 15 and 16 by respective paths including mixers 69—70, conductors 79 and 80, contacts 4 of switches 18 and 19, contacts 2 of switches 18a and 19a, and conductors 29 and 28.

A similar path may be traced for the voltage output of target selector potentiometer unit 67 which passes through mixers 71 and 72 and contacts 3 of switches 18 and 19, by way of conductors 83 and 84.

The path for the deflection control voltages from target selector potentiometer unit 68 traverse the respective paths including mixers 73 and 74, conductors 87 and 88, contacts 2 of switches 18 and 19, contacts 2 of switches 18a and 19a, and conductors 29 and 28.

The output of sinusoidal oscillator 75 is fed by conductor 85 to the entire bank of the vertical deflection mixers 70, 72 and 74 where it is combined with one of the respective pairs of direct current control voltages from the target selector potentiometers 66—68 in a manner previously described.

The output of sinusoidal oscillator 75 is also fed to a conventional phase shifter 76 where the voltage is shifted in phase by 90 degrees and fed by conductor 86 to the entire bank of horizontal deflection mixers 69, 71 and 73 for reasons previously explained.

The output of oscillator 75 is also used to intensity modulate the intensity control electrode 17 by way of a path including conductor 89, contact 2 of switch 20, contact 2 of switch 20a, and conductor 32 to produce a single arc segment forming code marker f. Since the beam of indicator 1 is cut off during the negative swing of the voltage output oscillator 75, the target designation mark f made during time interval 2 of FIGURE 4 will have one dash forming a semi-circle about target g.

Sinusoidal code oscillators 90—91 are provided to intensity modulate intensity control electrode 17 during time intervals 4 and 3 respectively to produce three arc segments of code marker b and the two arc segments of code marker d. The frequency of sinusoidal code oscillators 90 and 91 are accordingly made respectively three and two times the frequency of code oscillator 75.

FIGURE 6 discloses apparatus for producing two direct current control voltages whose magnitude and polarity are proportional respectively to the sine and cosine of the angle of rotation of a control shaft. The potentiometer there shown is used for director azimuth potentiometer units 33 and 34, and for search radar potentiometer unit 25.

The potentiometer unit there shown comprises a non-linearly wound resistance 92 forming a closed loop and two movable contact members 93—94 relatively fixed at right angles to each other which are connected to respective slip rings 95 and 96. The non-linearity is such that the resistance of the winding has a sinusoidal distribution. That is to say, the resistance of the winding per degree varies as the consine of the angle measured from a reference point 97. Thus there would be a maximum resistance in the vicinity of points 97 and 98 which are diametrically opposite each other, and minimum change of resistance in the vicinity of points 99—100 which are at right angles to points 97—98. If the ground or reference voltage point is made at a point 97, which is one of the points of maximum resistance variation, and a balanced direct current voltage having equal positive and negative potential points about ground is applied across the points 99—100 which are points of minimum resistance variation, then the voltage between the perpendicularly related movable contacts 93—94 and reference point 97 will vary as a sine function as the contacts are rotated. One revolution will produce one cycle of voltage variation. The degree voltage change between one movable contact 94 and reference point 97 and between the other movable contact and reference point 97 will be 90 degrees out of phase.

The outputs from the respective movable contacts 93—94 are applied to respective potentiometers 101—102. The movable contacts 103—104 of potentiometers 101—102 are ganged together and are located at the same points on their respective potentiometers. Varying the position of movable contacts 103—104 will vary the absolute amplitude of the sinusoidal voltage variation. In the case where the control voltage output of the potentiometer of FIGURE 6 is applied to respective sweep circuits similar to that of Rieke et al. described above, varying the ganged potentiometer controls 103—104 will increase the amplitude of the sweep proportionally, thus increasing the size of the sweep on the face of cathode ray tube 1.

Referring again to FIGURE 3, the timing of the movement of switches 18, 19 and 20 from position to position is controlled by means of a suitable time control device 21, and the movement of priority control switches 18a, 19a, and 20a are controlled by control means 21a.

The mechanical type switch arrangement shown in FIGURE 3 is actually impractical since extremely high switching rates are necessary. The mechanical switch arrangement has been shown only to simplify the circuitry of FIGURE 3.

The electronic equivalent of the switch arrangement of FIGURE 3 is shown for purposes of simplification only in part in FIGURE 7 to which reference is now made.

Gates 105, 106, 107, 108, 109, 110, 111, 112 and 113 are respective circuits which produce outputs only when a proper control voltage is fed thereto, for example, a negative unblocking voltage. Stages 105, 106 and 107 have a common output circuit but separate input circuits. These later gate circuits are equivalent in function to three switch positions of one of the switches 18, 19 or 20 if the gates 105, 106 and 107 are separately rendered operative to pass a signal to the common output circuit.

In a like manner gate circuits 108, 109 and 110 and 111, 112 and 113 have respective common output circuits but separate signal input circuits and are respectively equivalent in function to three switch positions on the other two mechanical switches of FIGURE 3. When any of the gating stages 105—113 are unblocked by a suitable gating pulse the signal input thereto appears at the output. Of course, in the absence of a gating pulse, no signal will pass.

All of the outputs of one bank of gates 105-107 may be connected to the common output lead 29 which is connected to the horizontal deflection plates. The output of the bank of gates 108-110 may be connected to the common output lead 28, and similarly the output of gates 111-113 may be coupled to lead 32.

Gates 105-113 are, in the present embodiment, unblocked three at a time in sequence by the application of negative pulses thereto. Such gating pulses are derived in part from a sequential trigger circuit of which stages 114, 115 and 116 are a part. Stages 114-116 each may comprise a one-shot multivibrator, the stages being sequentially connected in a well-known manner whereby a pulse is obtained from the reset of each stage to trigger the next succeeding stage.

The pulse for initially triggering the first stage 114 of the sequential chain is obtained from a free-running timing multivibrator 117 of the well-known type. Thus, each time multivibrator 117 produces a trigger pulse, stages 114–116 are sequentially tripped and then the circuit awaits another trigger pulse from multivibrator 117. This circuit performs the function of time control 21 discussed in connection with FIGURE 3, thus stage 114, upon receiving a trigger pulse from time control multivibrator 117, will remain tripped for a period equal to time interval 1 shown in FIGURE 4d. Likewise, stage 115 will be tripped during time interval 2 and stage 116 corresponds to interval 3.

When any one of stages 114–116 is tripped a negative pulse may be derived therefrom equal in duration to one of time intervals 1–5 of FIGURE 4d. These negative pulses control in part the application of gating pulses to gates 105–113 in the manner to be described.

The output of stages 114, 115 and 116 are coupled to priority control gate circuits 118, 119 and 120 respectively, from which gating pulses for respective signal gate banks 105, 108, 111 and 106, 109, 112 and 107, 110, 113 are obtained. Gates 118–120 perform the function of determining which of stages 114–116 are tripped during the period when the priority control pulse of FIGURE 4e occurs and supplying to the respective banks of signal gates appropriate gating pulses. For example, referring to FIGURES 4e and 4d a control pulse is seen to begin near the end of time interval 1 and overlap a part of time interval 2. Thus, gate 118 should supply a gating pulse to the bank of signal gates 105, 108 and 111 corresponding in duration and time to interval $e_1$, and gate 119 a pulse to bank 106, 109 and 112 during interval $e_2$.

As shown in FIGURE 7 gates 118, 119 and 120 may be "negative and" type gate circuits each comprising a pair of diodes 121 and 122 having separate plate inputs but a common cathode circuit of a resistance 123 connected to a source of negative potential. As shown each right-hand diode 122 is connected to the corresponding stage 114–116, and the left-hand diodes 121 are connected by common lead 124 to inverter 55. Lead 126 couples the corresponding signal gate bank to output point 125.

In operation point 125 can only become negative when both diodes 121 and 122 have a negative plate potential, corresponding to coincidence of a priority control pulse from inverter 55 and a negative pulse from the corresponding stage 114–116. When either or both of diodes 121, 122 have a plate potential at ground, then point 125 will likewise be at ground potential.

When stage 114 is tripped the circuit of FIGURE 7 is equivalent to the condition wherein switches 18, 19 and 20 of FIGURE 3 are in switch position 1. Likewise, tripping of stage 115 renders the circuit analogous to switch position 2 of switches 18, 19 and 20, etc. As many switch positions may be provided as are necessary by adding other gate banks.

As described hereinbefore the search radar sweeps and video information are common leads 28, 29 and 32 and indicator 1 by a separate priority circuit including gate 54. That the gating pulse which opens gate 54 is coextensive with the search radar sweeps and the gating pulse which partially unblocks negative and gates 118–120 is coextensive with the search radar "dead" period, has also been discussed. During the period in which gate 54 is unblocked and gates 118–120 are blocked by the absence of a negative pulse on line 124, the circuit is equivalent to the condition wherein switches 18a, 19a and 20a of FIGURE 3 are in switch position 1. When gate 54 is blocked and gates 118–120 are partially unblocked by the priority control pulse, the circuit is analogous to switches 18a–20a being in switch position 2.

As is apparent to those skilled in the art, the time necessary for the search radar antenna 9 to scan an entire horizon (360°) generally takes a period measured in seconds, as distinguished from microseconds, due to among other reasons, the mechanical problem of rotating antenna 9. The long persistence of a cathode ray tube screen used in search radar plan position indicators causes a map-like presentation of the targets surrounding the search antenna to appear when in reality the beam only sweeps a narrow portion of the screen at any instant. Accordingly the persistence characteristics of already developed cathode ray tubes requires that the rate at which a given portion of the screen of the cathode ray tube is excited be sufficiently high to maintain a continuous visual indication.

Since the indication shown in FIGURE 1 comprises numerous coded marks covering the face of the tube, great confusion would result without a color differentiation between the targets and coded marks. That is to say, the various coded marks may be mistaken for targets without such a two color system.

The present invention utilizes the characteristics of conventional cathode ray tube to produce a two color presentation.

Most long persistence cathode ray tube screens used for search radar plan position indications are composed of two different phosphors, generally a short persistence, high illumination phosphor which is excited by the electron beam, and a long persistence lower illumination phosphor which is excited primarily by the illumination of the short persistence screen. The P–7 and P–14 cathode ray tube screens are examples of this type and have a blue fluorescence from the short persistence phosphor, and a yellow or orange phosphorescence from the long persistence phosphor.

By utilizing frequent low level excitation of the screen, the blue short persistent phosphorescence will become prominent. If infrequent high level excitation is utilized, the orange phosphorescence will predominate providing excitation intervals are one second or more since the blue fluorescence lasts only for a short instant.

Accordingly, if a high intensity beam is utilized for the search radar target information, and a low intensity beam is utilized for the director azimuth markers $a$ and $h$, and the target designation marks $b$, $d$, and $f$, a very satisfactory two color presentation results.

Regulating the amplitude of the voltage fed to the control grid 17 of the cathode ray tube will of course vary the beam intensity.

The information conveyed by short persistence low intensity beam must be fed to the indicator 1 at a high rate if a clear blue indication is to be seen. This could not be accomplished by feeding the coded marker information at one second intervals. Consequently the coded information is fed to indicator 1 during the so called dead period of the search radar sweep waveform. Thus, the various voltages switched to the deflection plates 15–16 of indicator 1 cause the electron beam to have widely different positions on the face of indicator 1 during the short time interval between successive sweeps of the search radar sweep. This necessitates the use of a electrostatic deflection system since the deflection system must be able to respond to many sudden changes of sweep voltage levels. Magnetic deflection systems cannot be made to readily respond to these sudden changes in voltage (or current) levels fed thereto, which in the instant case represents widely different azimuth positions of the director and target designation marks, for reasons apparent to those skilled in the art.

In the embodiment of the present invention just discussed, there are several sweep generator circuits which feed into a commutation circuit and thereby successively switched to the cathode ray tube deflection means. A variation would provide a single sweep generator, the input of which is coupled to a commutation circuit that successively coupled the various direct current voltage of the instant invention to the single sweep generator. The cathode ray tube indicator would then be directly coupled to a single sweep generator which would have the advantage of assuring that each of the various cathode ray beam sweeps would begin at precisely the same point. Where several sweep generators are employed, this advantage is not always retained.

Of course, where it is not necessary to give the search radar priority, the various information including the search radar information may be successively switched to the cathode ray indicator tube. This would obviously simplify the system as the priority circuits no longer would be needed.

Although the embodiments disclosed in the drawings and preceding description are the preferred embodiments, many modications may be made thereof without deviating from the scope of the broadest aspects of the present invention.

The invention described herein may be manufactured and used by or for the Government of the United States of America for governmental purposes without the payment of any royalties thereon or therefor.

What is claimed is:

1. In combination, a cathode ray tube indicator, a space scanning radar system including deflection voltage generating apparatus operable synchronously with the space scanning of said radar, auxiliary director radar apparatus for determining target elevation range and azimuth, said auxiliary radar including voltage generating apparatus for generating signals indicative of the train direction thereof, and switching means for alternatively impressing the outputs from said space scanning and auxiliary radar on said indicator to correlate the detection of objects by said space scanning radar with the train position of said auxiliary radar.

2. A fire control target indication and designation system for use with directive searching means utilized for obtaining range and direction information on a given designated target comprising a cathode ray tube having a single electron-gun assembly, first means for causing a map like presentation of the targets in a given area to appear on the screen of said cathode ray tube, second means for causing an indication of the direction in which said directive searching means is searching relative to said targets to appear on said screen, third means for producing and positioning a movable identification mark on said screen, coupling means for successively coupling said second and third means to said cathode ray tube, and means responsive to said first means for rendering said coupling means ineffective and for coupling said first means to said tube.

3. A fire control target indication and designation system for use with directive searching means utilized for obtaining range and direction information on a given designated target comprising a cathode ray tube having a long and a short persistence phosphor providing color differentiation when high and low intensity beam excitations are respectively applied to the intensity grid thereof at low and high repetition rates and including a single electron-gun assembly, first means for causing a high beam intensity map like presentation of the targets in a given area to appear on the screen of said cathode ray tube, second means for causing a low beam intensity indication of the direction in which said directive searching means is searching relative to said targets to appear on said screen, third means for producing and positioning a low beam intensity identification mark on said screen, coupling means for successively coupling said second and third means to said cathode ray tube, and means responsive to said first means for rendering said coupling means ineffective and for coupling said first means to said tube.

4. A target designation system comprising a cathode ray tube indicating means for simulating on the screen thereof the relative positions of a group of targets, and code marker voltage generating means coupled to said cathode ray tube for causing the electron beam thereof to trace on said screen a ring of arc segments of different number about each of said simulated target positions.

5. A target designation system comprising a single beam cathode ray tube including beam deflection means and intensity control means, signal voltage generating means adapted to be coupled to said deflection and intensity control means for simulating on the screen of said tube the relative positions of a group of targets, biasing voltage generating means for each of a predetermined number of said targets and adapted to be coupled to said deflection means for biasing the beam of said tube to the simulated posing an alternating-current voltage on the bias voltage output of said biasing voltage generating means to cause said beam to trace a mark on said screen for each of said number of targets, and gating means for successively coupling said signal voltage generating means and said biasing voltage generating means to said tube.

6. A target designation system comprising a single beam cathode ray tube including beam deflection means and intensity control means, signal voltage generating means adapted to be coupled to said deflection and intensity control means for simulating on the screen of said tube the relative positions of a group of targets, manually adjustable biasing voltage generating means for each of a predetermined number of said targets and adapted to be coupled to said deflection means for biasing the beam of said tube to the simulated positions of said number of targets, means for superimposing an alternating-current voltage on the bias voltage output of said biasing voltage generating means to cause said beam to trace a mark on said screen for each of said number of targets, and gating means for successively coupling said signal voltage generating means and said biasing voltage generating means to said tube.

7. A target designation system comprising a cathode ray tube including beam deflection means and intensity control means, signal voltage generating means adapted to be coupled to said deflection and intensity control means for simulating on the screen of said tube the relative positions of a group of targets, biasing voltage generating means for each of a predetermined number of said targets and adapted to be coupled to said deflection means for biasing the beam of said tube to the simulated positions of said number of targets, means for superimposing an alternating-current voltage on the bias voltage output of said biasing voltage generating means to cause said beam to trace a marker on said screen for each of said number of targets, modulating voltage generating means adapted to be coupled to said intensity control means to modulate said beam to provide distinguishing characteristics for said target markers, and gating means for successively coupling said signal voltage generating means to said deflection and intensity control means in a first period and said biasing voltage generating means to said deflection means and said modulating voltage generating means to said intensity control means in a second period.

8. In a fire control system utilizing a search radar having a directive antenna means to provide a map like presentation of a given area including targets located therein and one or more director radar units each having a highly directive antenna means for supplying accurate direction and range information of a given designated target, a director designation system comprising a cathode ray tube including a horizontal and vertical beam deflection means and an intensity control means, respective resolving means coupled to said search and director radar antenna means for developing pairs of direct current control voltages proportional to the sine and cosine of the bearing angles of the directive antenna associated therewith, respective sweep voltage generating means coupled to said resolving means for respectively generating a pair of sawtooth sweep voltages having an amplitude proportional to the magnitude of the pair of control voltages fed thereto from said resolving means, and switching means coupled between the output of said sweep generating means and said beam deflection means for successively coupling respective pairs of sawtooth voltages in the output of said sweep generating means to the horizontal and vertical deflection means of said cathode ray tube to cause the electron beam thereof to scan a line the position of which is an indication of the bearing of the antenna means associated with the coupled sweep generating means.

9. In a fire control system utilizing a search radar having a directive antenna means to provide a map like presentation of a given area including targets located therein and one or more director radar units each having a highly directive antenna means for supplying accurate direction and range information of a given designated target, a director designation system comprising a cathode ray tube including a horizontal and vertical beam deflection means and an intensity control means, respective resolving means coupled to said search and director radar antenna means for developing pairs of direct current control voltages proportional to the sine and cosine of the bearing angles of the directive antenna associated therewith, respective sweep voltage generating means coupled to said resolving means for respectively generating a pair of sawtooth sweep voltages having an amplitude proportional to the magnitude of the pair of control voltages fed thereto from said resolving means, switching means coupled between the output of said sweep generating means and said beam deflection means for successively coupling respective pairs of sawtooth voltages in the output of said sweep generating means to the horizontal and vertical deflection means of said cathode ray tube to cause the electron beam thereof to scan a line the position of which is an indication of the bearing of the antenna means associated with the coupled sweep generating means, and modulating means coupled to the intensity control means of said cathode ray tube for providing distinguishing characteristics to the beam trace representing the position of said director radar antenna means.

10. In a fire control system utilizing a search radar having a directive antenna means to provide a map like presentation of a given area including targets located therein and one or more director radar units each having a highly directive antenna means for supplying accurate direction and range information of a given designated target, a director designation system comprising a cathode ray tube including a horizontal and vertical beam deflection means and an intensity control means, deflection voltage generating means associated with each of said antenna means and adapted to be coupled to said cathode ray tube to cause the beam thereof to trace a line the position of which is an indication of the bearing of said respective antenna means, first switching means for successively coupling the output of the search radar deflection voltage generating means and at least one of the director radar deflection voltage means to the deflection means of said cathode ray tube in each search radar sweep cycle, signal means for providing visible spots on the face of said cathode ray tube at instants after the beginning of an associated beam sweep determined by the range of targets detected by said search radar unit, respective code modulating means for providing distinguishing characteristics to the cathode ray tube beam trace representing the bearing of said director radar antenna means, and second switching means synchronous with said first switching means for successively coupling the output of said signal means and the code modulating means corresponding to the coupled director radar deflection voltage means to the intensity control means of said cathode ray tube, the beam trace representing the bearing of said search radar antenna means producing a map like presentation of the targets detected thereby and the beam trace representing the bearing of respective director antenna means producing coded bearing indications.

11. In a fire control system utilizing a search radar having a directive antenna means to provide a map like presentation of a given area including targets located therein and one or more director radar units each having a highly directive antenna means for supplying accurate direction and range information of a given designated target, a director designation system comprising a cathode ray tube including a horizontal and vertical beam deflection means and an intensity control means, respective resolving means coupled to said search and director radar antenna means for developing pairs of direct current control voltages proportional ot the sine and cosine of the bearing angles of the directive antenna associated therewith, respective sweep voltage generating means coupled to said resolving means for respectively generating a pair of sawtooth sweep voltages having an amplitude proportional to the magnitude of the pair of control voltages fed thereto from said resolving means, first switching means successively coupling said pairs of sawtooth voltages in the output of said respective sweep generating means to the horizontal and vertical deflection means of said cathode ray tube to cause the electron beam thereof to scan a line the position of which is an indication of the bearing of the antenna means associated with the coupled sweep generating means, signal means for providing visible spots on the face of said cathode ray tube at instants after the beginning of an associated beam sweep determined by the range of targets detected by said search radar unit, respective code modulating means for providing distinguishing characteristics to the beam trace representing the bearing of said director radar antenna means, and second switching means successively coupling the output of said signal means and said respective code modulating means to the intensity control means of said cathode ray tube, the beam trace representing the bearing of said search radar antenna means producing a map like presentation of the targets detected thereby and the beam traces representing the bearing of respective director antenna means producing coded bearing indications.

12. In combination, a space scanning radar device including a transmitter and receiver a single beam cathode ray tube coupled to said receiver, a rotatable antenna for scannnig the transmitter and receiver sensitivity pattern 360° in azimuth, deflection circuit means for rotating the beam of said indicator in synchronism with the antenna rotation, voltage generating means for generating a signal characteristic of any given angular bearing and switch means for impressing the output of said voltage generating means on said indicator in sequential alternation with the output of said radar device.

13. A two-color visual presentation system for distinguishing between two sets of data comprising a cathode ray tube including a screen having a high-illumination short-persistence phosphor adapted to be fluoresced by the electron beam of said tube and a relatively low-illumination long-persistence phosphor adapted to be phosphoresced by radiation from said high illumination phosphor, means for applying one of said sets of data to said tube at a first repetition rate and cathode ray beam intensity, and means for applying the other of said sets of data to said tube at a second repetition rate and cathode ray beam intensity, said first rate and intensity causing preeminence of said fluorescence to produce a first color and said second rate and intensity causing preeminence of said phosphorescence to produce a second color.

14. A two-color visual presentation system for distinguishing between two sets of data comprising a cathode ray tube having a long and a short persistence phosphor, means for applying one of said sets of data to said tube at a low repetition rate and at high cathode ray beam intensities, and means for applying the other of said sets of data to said tube at a high repetition rate and at low cathode ray beam intensities.

15. The method of utilizing a cathode ray tube having a combination long persistence and short persistence phosphor screen to provide color differentiation between two sets of data comprising the steps of applying one of said sets of data to said tube at a first repetition rate and cathode ray beam intensity, and applying the other of said sets of data at a second repetition rate and cathode ray beam intensity, said first rate and intensity causing preeminence of illumination from said short persistence phosphor and said second rate and intensity causing preeminence of illumination from said long persistence phosphor.

References Cited in the file of this patent

UNITED STATES PATENTS

| | | |
|---|---|---|
| 2,446,248 | Shrader | Aug. 3, 1948 |
| 2,568,265 | Alvarez | Sept. 18, 1951 |
| 2,590,114 | McVay | Mar. 25, 1952 |
| 2,602,162 | Kenyon | July 1, 1952 |
| 2,603,775 | Chipp | July 15, 1952 |
| 2,634,412 | Meagher | Apr. 7, 1953 |
| 2,692,381 | Huber | Oct. 19, 1954 |
| 2,712,647 | Sherwin | July 5, 1955 |